US009086941B1

(12) United States Patent
Siegel

(10) Patent No.: US 9,086,941 B1
(45) Date of Patent: Jul. 21, 2015

(54) SYSTEM AND METHOD FOR PROVIDING PREDICTIVE SOFTWARE UPGRADES

(71) Applicant: Massachusetts Institute of Technology, Cambridge, MA (US)

(72) Inventor: Joshua Eric Siegel, Bloomfield Hills, MI (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/289,975

(22) Filed: May 29, 2014

(51) Int. Cl.
G05D 1/00 (2006.01)
G06F 9/445 (2006.01)
G07C 5/00 (2006.01)
H04L 29/08 (2006.01)

(52) U.S. Cl.
CPC G06F 8/65 (2013.01); G07C 5/008 (2013.01); H04L 29/08981 (2013.01)

(58) Field of Classification Search
USPC .......................................................... 701/1
See application file for complete search history.

(56) References Cited

U.S. PATENT DOCUMENTS

| 7,155,321 | B2 | 12/2006 | Bromley |
| 8,306,521 | B2 | 11/2012 | Ban |
| 2005/0090941 | A1* | 4/2005 | Stefan et al. ........................ 701/1 |
| 2005/0216903 | A1* | 9/2005 | Schaefer ......................... 717/168 |
| 2006/0130054 | A1* | 6/2006 | Bocking et al. ................ 717/173 |
| 2007/0185624 | A1 | 8/2007 | Duddles |
| 2009/0119657 | A1* | 5/2009 | Link, II .......................... 717/171 |
| 2011/0307336 | A1* | 12/2011 | Smirnov et al. ............. 705/14.62 |
| 2011/0307882 | A1* | 12/2011 | Shiba ............................. 717/173 |
| 2011/0320089 | A1 | 12/2011 | Lewis |
| 2013/0073672 | A1* | 3/2013 | Ayed .............................. 709/217 |
| 2013/0131909 | A1* | 5/2013 | Cooper et al. ................... 701/23 |
| 2013/0245884 | A1* | 9/2013 | Forutanpour et al. ........... 701/36 |
| 2014/0006555 | A1* | 1/2014 | Shields .......................... 709/217 |

OTHER PUBLICATIONS

Siegel, Joshua Eric; Design, Development, and Validation of a Remotely Reconfigurable Vehicle Telemetry System for Consumer and Government Applications, published by Massachusetts Institute of Technology, Jun. 2011.

* cited by examiner

Primary Examiner — Hussein A. Elchanti
(74) Attorney, Agent, or Firm — Peter A. Nieves; Sheehan Phinney Bass & Green PA

(57) ABSTRACT

A system and method for providing predictive software upgrades is provided. Generally, the method comprising the steps of: querying a virtual vehicle application that simulates a real vehicle to determine one or more time period when the vehicle will be in an off state for long enough for updating of software to take place without the vehicle operating status being changed; transmitting a push notification to a user portable interactive communication device providing the one or more time periods determined, to the user for selection of one or more time period; receiving a selected one or more time period for upgrading of the software; transmitting a request for confirmation of a first of the one or more time period to the user portable interactive communication device at a predefined time period prior to the first of the one or more time period; and if the user confirms the first time period, instructing the upgrading of the vehicle control module by the vehicle at the first time period.

19 Claims, 4 Drawing Sheets

SYSTEM AND METHOD FOR PROVIDING PREDICTIVE SOFTWARE UPGRADES

FIELD OF THE INVENTION

The present invention is generally related to updating software, and more particularly is related to optimized updating of software through use of historical data and user feedback to minimize application interruption during the updating.

BACKGROUND OF THE INVENTION

Vehicles today have hundreds of sensors and actuators designed to provide safe, reliable, convenient and comfortable transportation. Each of these devices interfaces with one of dozens of computer modules designed for data integration and processing. These computers control powertrain operation, chassis integration, infotainment, and additional vehicle functionality through complex programs that are exceedingly difficult targets for software development.

This complexity can lead to several problems. In cases, software is released to the public in the beta stage of development to meet shipping deadlines. Features may be added later to improve competitiveness across brands, or bugs may be discovered that compromise comfort or safety. Modern automotive computers are extremely complicated, yet a small software bug can result in severe safety issues possibly resulting in federal recalls. Technology exists today capable of remotely updating vehicle software. However, due to rigorous checksum validation, these software updates may take several hours to complete, during which the vehicle is unusable for risk of rendering a control module inoperative. Specifically, if a vehicle is powered on during the updating of vehicle software, the use of the vehicle may interrupt the upgrade process and thereby render a control module of the vehicle inoperative temporarily or permanently. For purposes of clarity, powering on means activated, or if a vehicle key switch commands power to a module or modules of the vehicle.

Typically, modules in vehicles "phone home" or are pushed details about software update candidates via a telemetry unit. These updates may download overnight, or even provide feedback on an in-vehicle display informing the user that their software is being upgraded and not to change the operating state of the vehicle until the update event is complete. This can work, but in some cases, the software updates happen at inopportune times and users intervene necessitating the programming event be redone, if the module firmware does not become corrupted upon the loss of power. This is presently a problem, as automobile manufacturers face a constant struggle determining tradeoffs in acceptable latency and power consumption, and often elect to install software as soon as the download is complete, irrespective of driver needs.

Certain automobile manufacturers confronted with the difficulty of upgrading software resort to recalling vehicles, thereby requiring vehicle owners to lose valuable time and causing a great deal of man hours in non-billable labor. Even in the situation where a fail-safe downloading program is used, interruption of the downloading program will not cause crashing of a module performing the upgrade, however, it will prevent the software update from taking place and requires that the time consuming process be restarted.

There has been some discussion regarding over the air updates recently as a solution to this problem. In the few cases where a manufacturer remotely updates vehicle software, as is the case with Mercedes' mBrace 2 system, these updates impact infotainment applications and not control module software. The primary reason control modules are not presently updated is the result of the highly complex software inherent to these core systems. As criticality and integration increase, so increases the file size of any related software update. These files are large, transfer slowly due to bandwidth constraints, and must continuously undergo checksum validation to ensure that mission-critical software is not corrupted. This same rigorous software analysis occurs during module reflashing events, ensuring that the update is correct on a byte-per-byte basis. The end result is an update process that often takes several hours, even when dealing with relatively small files like a ten-megabyte engine control software update.

The issue of slow downloads has been addressed through the use of higher-throughput networks and with the use of smart telematics systems, on-board storage and extra flash memory internal to these modules for storing software images in a temporary holding buffer. Despite this reduction in barrier to entry, over the air upgrades remain unlikely to be adopted due to the long installation time during which a user cannot operate the vehicle without fear of corrupting the software on various modules. Hardware redundancy increases cost and complexity of these modules and time to market is long.

This upgrade difficulty is not limited to vehicles, but instead is experienced in upgrading software of any device or system such as, but not limited to, cellular telephones, battery management systems, appliances such as smart refrigerators, entertainment devices such as smart televisions or game consoles, personal computing devices (for instance, updating of the operating system of a computer), and farm/industrial equipment.

Thus, a heretofore unaddressed need exists in the industry to address the aforementioned deficiencies and inadequacies.

SUMMARY OF THE INVENTION

Embodiments of the present invention provide a system and method for providing predictive software upgrades. Preferably, the upgrades are performed "over-the-air," although the present invention is not limited as such, but instead may be provided in a tethered environment. Briefly described, in architecture, one embodiment of the system, among others, can be implemented as follows. The system contains a memory and a processor configured by the memory to perform the steps of: determining one or more time period when a device having software to be upgraded will be in an off state for long enough for updating of software to take place without the device changing state from off to on; transmitting a push notification to a user portable interactive communication device providing the one or more time periods determined, to the user for selection of one or more time period; receiving a selected one or more time period for upgrading of the software; transmitting a request for confirmation of a first of the one or more time period to the user portable interactive communication device at a predefined time period prior to the first of the one or more time period; and if the user confirms the first time period, instructing the upgrading of the software at the first time period.

The present invention can also be viewed as providing methods for providing predictive software upgrades. In this regard, one embodiment of such a method, among others, can be broadly summarized by the following steps: querying a virtual vehicle application that simulates a real vehicle to determine one or more time period when the vehicle will be in an off state for long enough for updating of software to take place without the vehicle operating status being changed;

transmitting a push notification to a user portable interactive communication device providing the one or more time periods determined, to the user for selection of one or more time period; receiving a selected one or more time period for upgrading of the software; transmitting a request for confirmation of a first of the one or more time period to the user portable interactive communication device at a predefined time period prior to the first of the one or more time period; and if the user confirms the first time period, instructing the upgrading of the vehicle control module by the vehicle at the first time period.

Embodiments of the invention are also provided that are not particular to a vehicle or upgrading of vehicle software. Such a method comprises the steps of: determining one or more time period when a device having software to be upgraded will be in an off state for long enough for updating of software to take place without the device changing state from off to on; transmitting a push notification to a user portable interactive communication device providing the one or more time periods determined, to the user for selection of one or more time period; receiving a selected one or more time period for upgrading of the software; transmitting a request for confirmation of a first of the one or more time period to the user portable interactive communication device at a predefined time period prior to the first of the one or more time period; and if the user confirms the first time period, instructing the upgrading of the software at the first time period.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present invention provides a system and method for using historic user data and multi-point feedback to inform a vehicle owner of their eligibility for a software upgrade and to locate an optimal time for installing the software. It should be noted that while the present disclosure provides the example of upgrading vehicle software, the present invention is not intended to be limited to vehicle software upgrades exclusively. Instead, the present system and method may be used for upgrading software of any device or system such as, but not limited to, cellular telephones, battery management systems, appliances such as smart refrigerators, entertainment devices such as smart televisions or game consoles, personal computing devices (for instance, updating of the operating system of a computer), and farm/industrial equipment.

Figure 1:
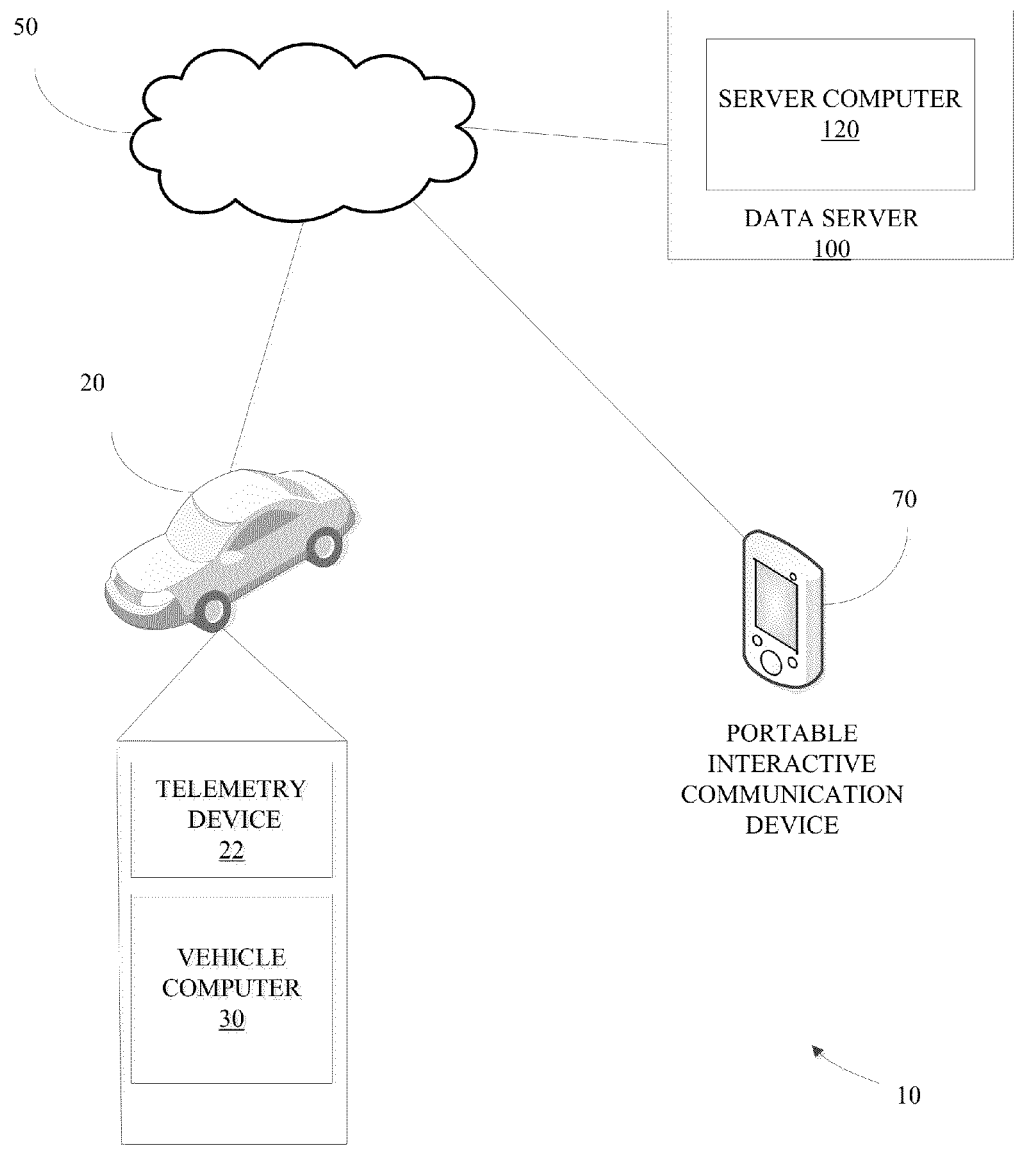
FIG. 1 is a schematic diagram illustrating a network in which the present system and method may be used.

FIG. 1 is a schematic diagram illustrating a network 10 in which the present system and method may be provided. For illustrative purposes, the example of a vehicle 20 is used in FIG. 1. The vehicle 20 contains a telemetry device 22, and a vehicle computer 30. The vehicle computer 30 is illustrated in further detail by the schematic diagram of FIG. 2.

The telemetry device 22 is a standard telemetry device providing a data link to a data server 100. Data collected and transmitted by the telemetry device 22 includes, but is not limited to, identification of the vehicle, date and time when the vehicle is turned on, location of the vehicle, when the vehicle stops, and other vehicle use history, driver identification, On-Board diagnostic data, identifying information for linked devices, such as cellular telephones, and linked data, such as user calendars, all also referred to herein as historic user data. Collection of the data allows for building of a "virtual vehicle" at the data server 100, as built by a virtual vehicle application, where specific information and trends of vehicle use may be used to anticipate future vehicle use and trends, as described further herein below. The virtual vehicle duplicates a multiplicity of measurable vehicle and related parameters, including environmental information and other data sourced, scraped, or otherwise collected from third-party sources, providing the foundation for a programmatic object to be used as the basis for computer applications, such as applications within the server 30. In addition to mirroring diagnostic and other powertrain or general operational parameters in the virtual vehicle, related parameters additionally inform the virtual vehicle application and provide the virtual vehicle with context information related to the driver, passengers, and environment. At the server, server information itself, such as CPU load, may be paired with virtual vehicle data to aid in the decision-making process of the server for determining when to transmit data to the vehicle or a user device, as explained in further detail herein.

The virtual vehicle application describes the creation of a digital duplicate of a physical vehicle, for use as a programmatic I/O (input/output) in Cloud-based application development. This digital mirror, or "Avacar," created by the virtual application, consists of a dynamically updated, real-time model of a vehicle based off of On-Board Diagnostic information, data values reported from the sensor mirroring device itself (e.g., the telemetry device) (such as location, motion, and vehicle context), manufacturer-proprietary information made available to the connecting device, and a series of values bound to outputs such as actuation devices (e.g. door locks) or computer settings (e.g., writable radio presets). The virtual vehicle is dynamically scaled such that the mirroring may include every measurable or controllable device on or connected to a vehicle network, and is connected to a dynamic storage device such that new incoming and outgoing data types may be easily added. In the simplest sense, the virtual vehicle application is provided with all measurable parameters relating to vehicle status in order to allow the digital representation of the operational state, health, and status of the physical vehicle with which the application is associated.

The virtual vehicle application is used as a programmatic object for the basis of Cloud or other third-party application development. The virtual vehicle is bound to an API (application programming interface) such that data-read and data-write operations are end-hardware agnostic, at all points including in the data collection device and ultimately the end vehicle hardware. The virtual vehicle API identifies the vehicle type through a variety of methods, including but not limited to reading of the Vehicle Identification Number, and creates a dynamic mapping between API commands and vehicle-specific commands to abstract away development complexities. This allows more familiar human-readable commands (e.g. "windows_up( );") to be used, as opposed to more complex, brand-specific byte sequences. The use of a common API across vehicle makes and models enables applications to be deployed more rapidly, and speeds data collection for data-intensive applications.

The real-time virtual vehicle application is used to provide information and control inputs and outputs for real-time applications, like those that control actuators based on weather conditions or current location. Historic virtual vehicles and/or aggregations of many users' virtual vehicles are used to feed information to models that use broader vehicle data in order to optimize efficiency, reduce congestion, and decrease fuel consumption, by way of example.

The virtual vehicle application and resulting simulated/ emulated virtual vehicle are standardized to support interoperable data transfer and cross-automotive-manufacturer application development. Ensuring data interoperability and portability allows the virtual vehicle application to interface with a number of other application development platforms, as well as a number of other digitally duplicated objects, for example to facilitate the integration with home automation systems that warm up a user's home when he or she leaves work. By presenting the data in a standardized, documented format, developers are given the unique ability to integrate virtual vehicle data into their own applications, and in the present system and method such data is used, as is explained further herein. The telemetry device 22 and vehicle computer 30 communicate with the data server 100 via a communication network 50 such as, but not limited to, the Internet, Bluetooth, Global System for Mobile Communications (GSM), or another standard. It should be noted that any other communication network may be utilized. The data server 100 may contain a storage device 110 and a server computer 120. The data server computer 120 is further illustrated and described with regard to FIG. 3, as described herein below, and provides much of the functionality of the present system and method, as described herein.

As illustrated by FIG. 1, the network 10 also contains a portable interactive communication device 70. The communication device 70 may be any portable interactive communication device that is capable of allowing a user to receive a communication from the data server 100 and interact with the data server 100, as described in further detail herein. Examples of such portable interactive communication devices may include, but are not limited to, personal data assistants (PDAs), smart phones, personal computers, in-vehicle infotainment systems, wearable devices, tablet computers, and dedicated embedded devices.

Figure 2:
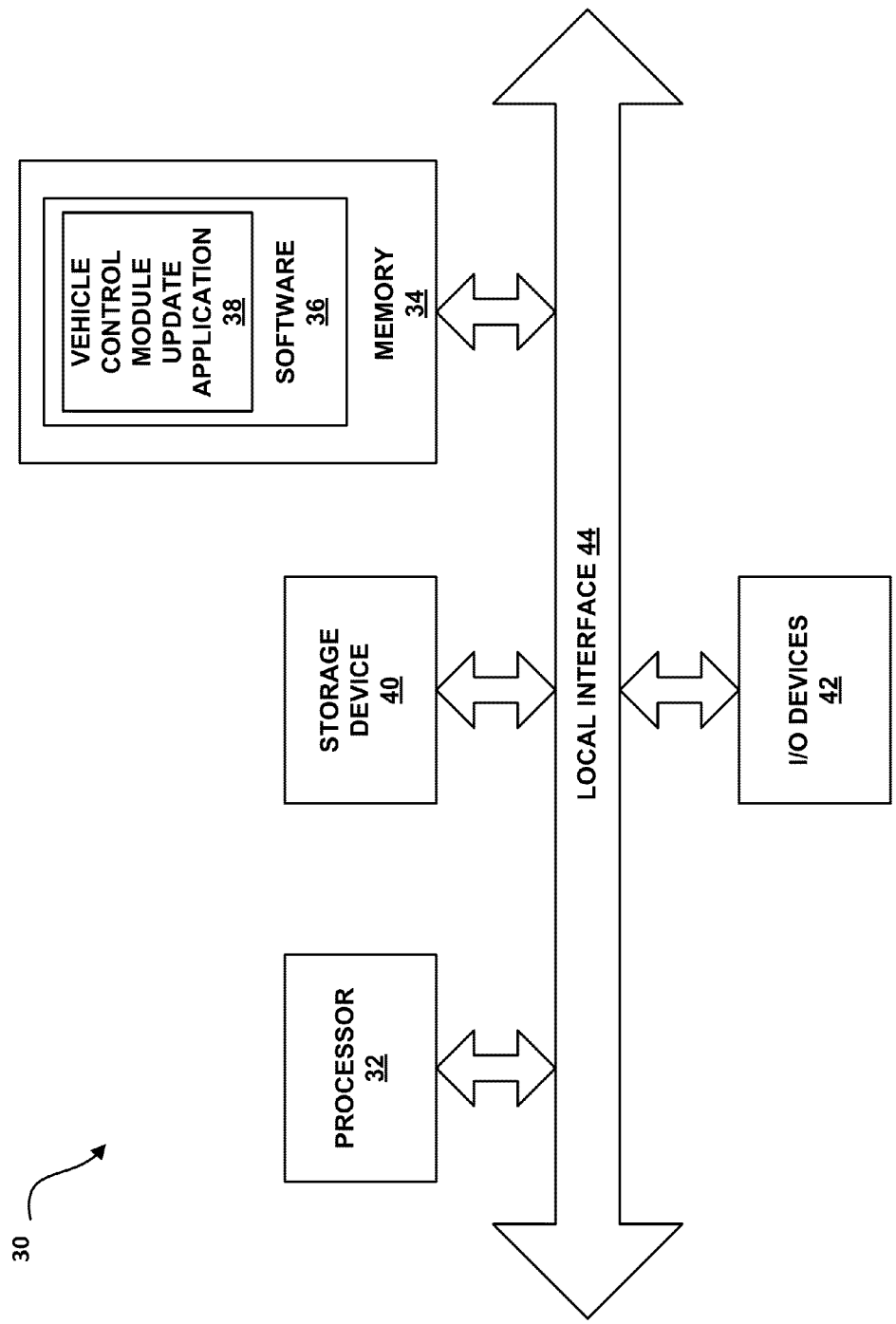
FIG. 2 is a schematic diagram illustrating the vehicle computer of FIG. 1.

Referring to FIG. 2, generally, in terms of hardware architecture, the vehicle computer 30 includes a processor 32, a memory 34, a storage device 40, and one or more input and/or output (I/O) devices 42 (or peripherals) that are communicatively coupled via a local interface 44. The local interface 44 can be, for example but not limited to, one or more buses or other wired or wireless connections, as is known in the art. The local interface 44 may have additional elements, which are omitted for simplicity, such as controllers, buffers (caches), drivers, repeaters, and receivers, to enable communications. Further, the local interface 44 may include address, control, and/or data connections to enable appropriate communications among the aforementioned components.

The processor 32 is a hardware device for executing software, particularly that stored in the memory 34, as described herein. The processor 32 can be any custom made or commercially available processor, a central processing unit (CPU), an auxiliary processor among several processors associated with the computer 30, a semiconductor based microprocessor (in the form of a microchip or chip set), a macroprocessor, or generally any device for executing software instructions.

The memory 34 can include any one or combination of volatile memory elements (e.g., random access memory (RAM, such as DRAM, SRAM, SDRAM, etc.)) and nonvolatile memory elements (e.g., ROM, EEPROM, hard drive, tape, CDROM, etc.). Moreover, the memory 34 may incorporate electronic, magnetic, optical, and/or other types of storage media. Note that the memory 34 can have a distributed architecture, where various components are situated remote from one another, but can be accessed by the processor 32.

Specific to the present system and method, software 36 in the memory 34 may include one or more separate programs or modules, each of which comprises an ordered listing of executable instructions for implementing logical functions of the present system and method, as described below. The software 36 in the memory 34 contains a vehicle control module update application 38. In addition, the memory 34 may contain an operating system (O/S) or any other module required by the vehicle. The operating system essentially controls the execution of computer programs and provides scheduling, input-output control, file and data management, memory management, and communication control and related services.

The vehicle control module update application 38 is provided within the vehicle 24 and controls when a vehicle control module update, stored within the vehicle storage device 24, is allowed to be used in updating a vehicle control module of the vehicle 24. As is further explained in detail herein below, the vehicle control module update is downloaded to the vehicle storage device 24 and stored in the vehicle storage device 24 until such time that chances of installation of the vehicle control module update being interrupted are determined to be very low.

It should be noted that while the abovementioned refers to the vehicle storage device 24 being local to the vehicle 24 and having the vehicle control module update stored therein, in accordance with an alternative embodiment of the invention, the vehicle storage device 24 may be removable, or be a device separate from the vehicle that may be connected to the vehicle for use in accordance with the present system and method.

The functionality of the vehicle computer 30 may be provided by a source program, executable program (object code), script, or any other entity containing a set of instructions to be performed. When a source program, then the program needs to be translated via a compiler, assembler, interpreter, or the like, which may or may not be included within the memory 34, so as to operate properly in connection with the O/S. Furthermore, the functionality of the vehicle computer 30 can be written as (a) an object oriented programming language, which has classes of data and methods, or (b) a procedure programming language, which has routines, subroutines, and/or functions.

The I/O devices 42 may include input devices, for example but not limited to, a keyboard, mouse, touchscreen, microphone, or other input device. Furthermore, the I/O devices 42 may also include output devices, for example but not limited to, speakers, monitors (e.g., touchscreens), or other output devices. Finally, the I/O devices 42 may further include devices that communicate via both inputs and outputs, for instance, but not limited to, a modulator/demodulator (modem; for accessing another device, system, or network), a radio frequency (RF) or other transceiver, a telephonic interface, a bridge, a router, or other device.

The storage device 40 may be any block data storage device, such as, but not limited to, hard disks or hard drives, optical discs, NAND flash memories, or any storage device capable of maintaining a sequence of bytes or bits having a nominal length (block size). As previously described, the vehicle control module update is stored on the storage device 40 until such time that the vehicle control module application 38 initiates updating of the vehicle control module with the stored vehicle control module update.

When the vehicle computer 30 is in operation, the processor 32 is configured to execute the software 36 stored within the memory 34, to communicate data to and from the memory 34, and to generally control operations of the vehicle computer 30 pursuant to the software 36. The software 36 and the O/S, in whole or in part, but typically the latter, are read by the processor 32, perhaps buffered within the processor 32, and then executed.

When the functionality of the vehicle computer 30 is implemented in software, it should be noted that the functionality can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The functionality of the vehicle computer 30 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

In an alternative embodiment, where the functionality of the vehicle computer 30 is implemented in hardware, the vehicle computer 30 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be noted that computers described herein, such as the vehicle computer 30 and the data server computer 120 may contain separate modules, wherein each module contains functionality for execution. As previously mentioned, functionality of the present system and method can be implemented in software, firmware, hardware, or a combination thereof.

Figure 3:
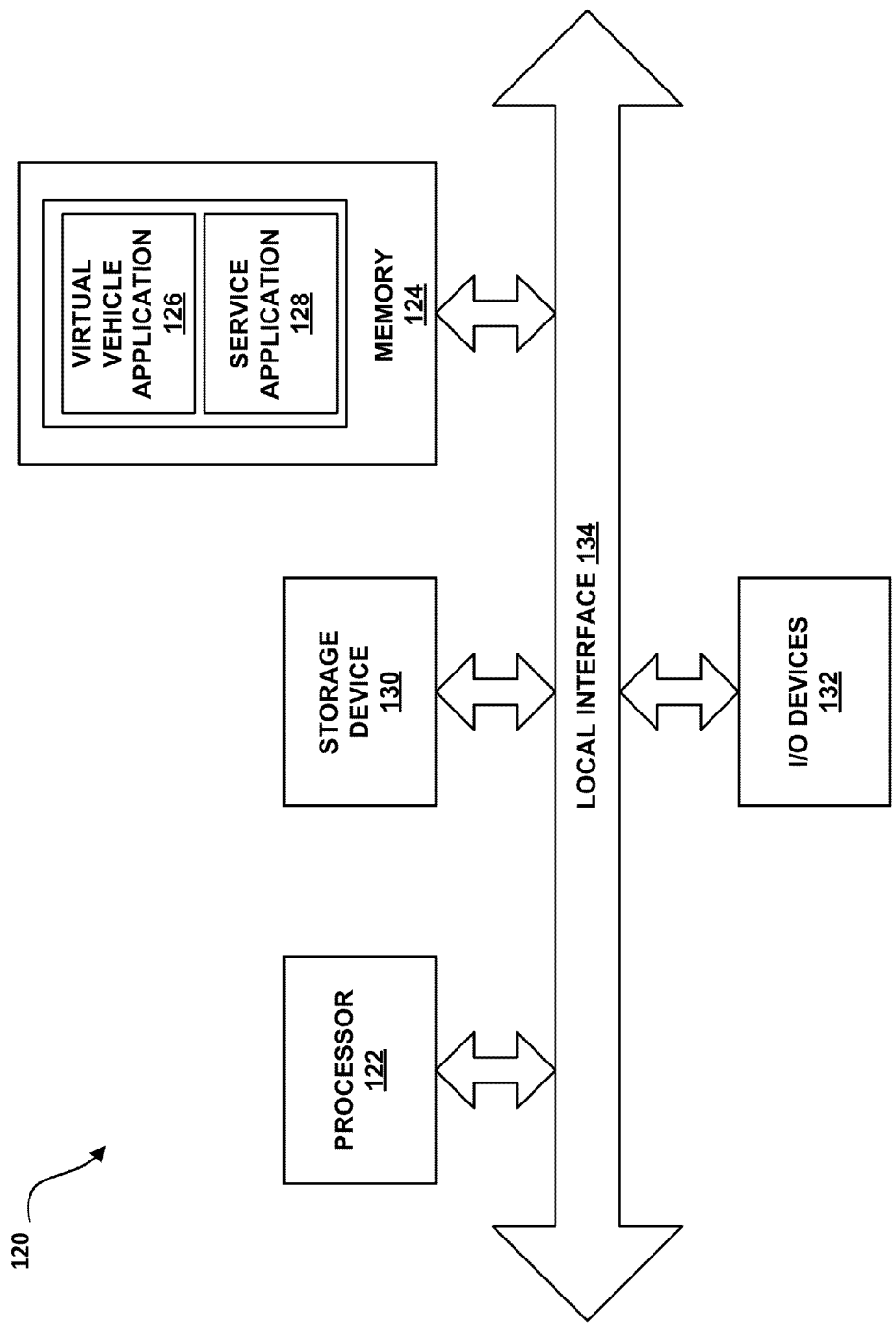
FIG. 3 is a schematic diagram illustrating a server computer in accordance with the present invention.

Referring now to FIG. 3, the data server computer 120 is further illustrated and described. As described herein, much of the functionality of the present system and method is provided by the data server computer 120. In accordance with the present invention, the data server computer 120 contains similar parts to the vehicle computer 30. Specifically, the data server computer 120 includes a processor 122, a memory 124, a storage device 130, and one or more input and/or output (I/O) devices 132 (or peripherals) that are communicatively coupled via a local interface 134, each of which functions is a manner similar to that of the vehicle computer 30.

The memory 124 of the data server computer 120 has stored therein a virtual vehicle application 126 and a service application 128. The virtual vehicle application 126 accumulates vehicle data received from the telemetry device 22 (FIG. 1) including, for instance, vehicle identification, user of the vehicle information, date and time when the vehicle is turned on, location of the vehicle, when the vehicle stops, and other vehicle use history (historic user data). The data is stored within the data server computer 120 storage device 130. It should be noted that the historic user data need not be stored within the data server computer 120, but instead may be stored in a separate storage device of the data server 100 or at a remote location. Further, the storage device 130 of the data server 100 may also have a vehicle control module update stored therein, as is described in further detail herein below.

After accumulation of vehicle data received from the telemetry device 22 (FIG. 1), the virtual vehicle application 126 combines captured information with additional data sources and provides data I/O for an Application Programming Interface (API), enabling a vehicle or set of vehicles to be used as programmatic objects serving as the basis for end-use applications. The virtual vehicle application abstracts the digital vehicle from the physical vehicle in that the API may use information to identify the vehicle type and turn API commands into manufacturer- or model-specific commands, reducing development complexities and allowing easy cross-platform software deployment. Additionally, the virtual vehicles may be access-controlled and secured to allow end-users to modulate and view the flow of information. An example of a virtual vehicle application and functionality is described in the publication entitled, "Design, Development, and Validation of a Remotely Reconfigurable Vehicle Telemetry System for Consumer and Government Applications", by Joshua Eric Siegel, dated June 2011, and published by Massachusetts Institute of Technology, which is incorporated by reference herein in its entirety.

To summarize, the virtual vehicle application uses historical and real-time vehicle context information collected at a server, or on a cloud platform, to assess the likelihood of software update interruption and identify optimal software upgrade times. Such software update interruption may happen due to any change in state of the vehicle, such as changing from being turned off with only battery power, to being turned on by local or remote key or switch. It should be noted that the off state still requires a power source to provide power to at least the vehicle computer.

As explained herein, the portable interactive communication device solicits user feedback on suggested times derived using the virtual vehicle data, for software download. Active supervision via the virtual vehicle application, the portable interactive communication device, feedback from the telemetry device, and other data, may be used to ensure non-interruption and/or provide damage mitigation associated with software upgrade interruption. In addition, in accordance with an alternative embodiment of the invention, the active supervision may be used to stop upgrading of software at a scheduled time, where the active supervision makes it clear that the associated vehicle will be in use during a previously scheduled upgrade time-period. Further, the active supervision can stop/safely terminate programming in the event that a user approaches the vehicle too closely or otherwise signals likely intent to change the operating status of the vehicle. In addition, the active supervision can prevent upgrading of the software in the event that a user approaches the vehicle too closely or otherwise signals likely intent to change the operating status of the vehicle.

The memory 124 of the data server computer 120 also contains the service application 128. The service application 128 provides the functionality necessary to minimize chances of vehicle control module update interruption. Functionality of the service application 128 is described in detail with regard to the flowchart of FIG. 4.

Figure 4:
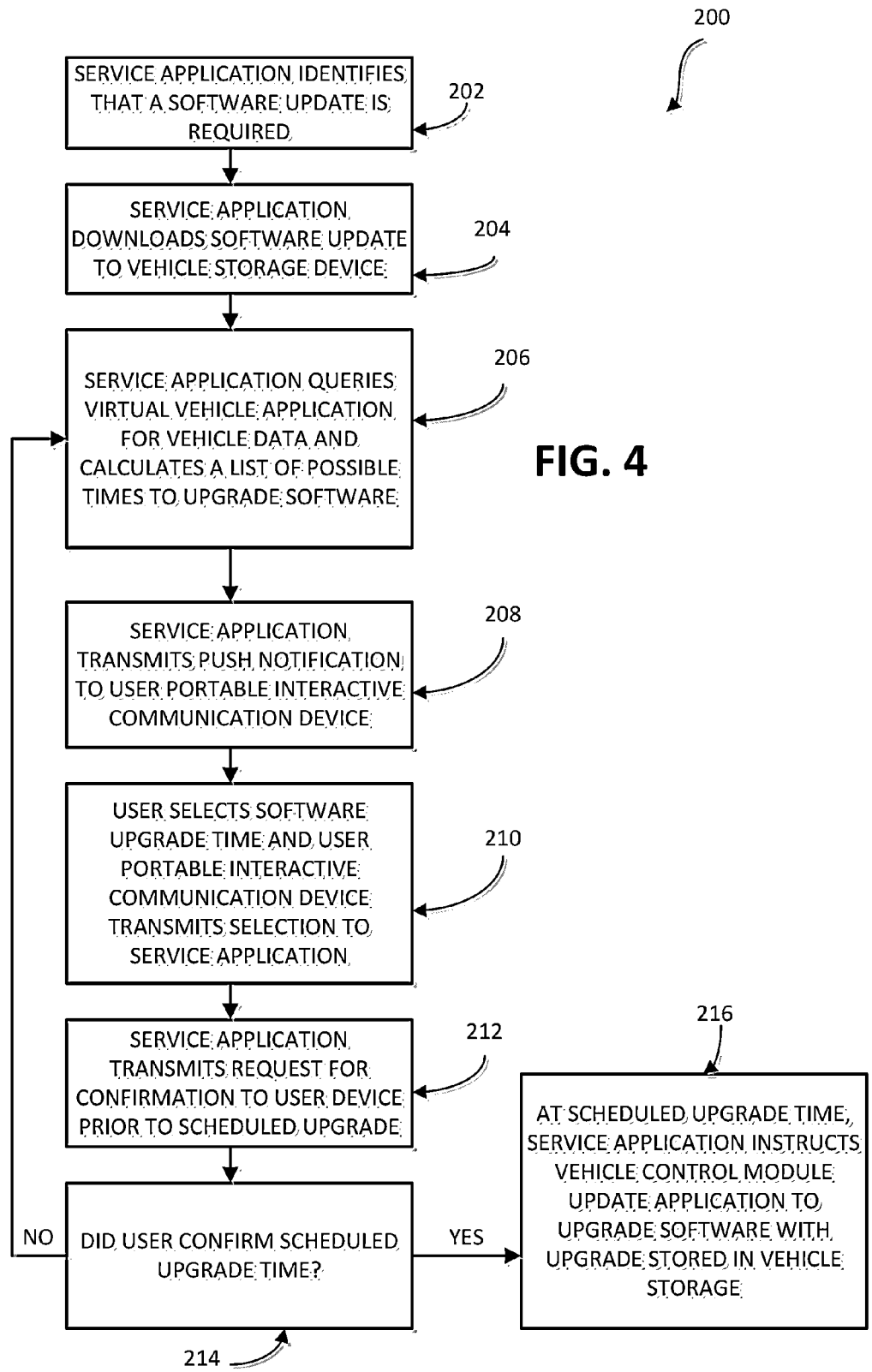
FIG. 4 is a flowchart illustrating a method of providing predictive, over the air, software upgrades, in accordance with the first exemplary embodiment of the invention.

FIG. 4 is a flowchart 200 illustrating a method of providing predictive, over the air, software upgrades, in accordance with the first exemplary embodiment of the invention. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As shown by block 202, the service application first determines that a software update is required for the vehicle control module of the vehicle 20 (FIG. 1). Such identification may be provided in one or more different manner. For instance, the service application may be used by a vehicle manufacturer. In this case, the vehicle manufacturer may log into the service application from a location remote to the data server 100 (FIG. 1). For instance, the OEM or a third-party software management company would notify a server they or a third party own that there is an update available. The server, a target for telematics device connectivity, would either notify the telematics device upon connection that an update is available, or would push a notification to the device either by opening a connection to the device or by way of another notification mechanism, e.g., SMS, to inform the vehicle to get the update information and begin the process when applicable.

In accordance with an alternative embodiment of the invention, where the software upgrade is instead required for a device or system other than a vehicle, a device manufacturer may take the place of the vehicle manufacturer described hereinabove.

As shown by block 204, after confirming that a vehicle control module update is available, the service application downloads the vehicle control module software update to the vehicle storage device 24 (FIG. 1) for future use by the vehicle control module update application 38. Downloading by the service application to the vehicle storage device 24 (FIG. 1) may be performed at any time that the vehicle storage device 24 (FIG. 1) is capable of receiving the vehicle control module update.

The service application 128 then queries the virtual vehicle application 126 for vehicle data and calculates a list of possible times to upgrade the vehicle control module with the vehicle control module update application 38 (block 206). It should be noted that the list may contain one or more possible time to upgrade. Options for possible times to upgrade the vehicle control module are identified as times when the vehicle is parked for a period of time sufficient for upgrading of the vehicle control module with the vehicle control module update, without the vehicle moving. As is known by those having ordinary skill in the art, vehicle control module updates do not require the vehicle to be turned on, but instead, simply that a power source is provided to the vehicle, such as a car battery. It is noted that one having ordinary skill in the art would know approximately how long of a period of time is required for upgrading a vehicle control module. The service application 128 is capable of taking the time required for upgrading of the vehicle control module and searching for times when the vehicle will be off for a time period that is more than the required time for upgrading of the vehicle control module.

It is noted that vehicles are typically located at the same locations when they are parked for a significant time period. For instance, a vehicle is typically parked for an elongated period of time at the home of the user. For this reason, the service application 128 may use location data of the vehicle in determining the list of possible times to upgrade the vehicle control module, although location data is not a requirement. In addition, the identification of the vehicle, date and time when the vehicle is turned on, when the vehicle stops, and other vehicle use history are used by the service application 128 to calculate the list of possible times to upgrade the vehicle control module.

One or more of many different methods may be used in calculating the list of possible times to upgrade the vehicle control module. For example, historic data provided by the virtual vehicle may be used to provide an average stop duration and standard deviation of stopped time for a frequented location such as home or an office building. This same historic information provides information about typical timing of trips to this location, along with a confidence interval. When confidence is sufficiently high, the trip start and end times are presented to a selection algorithm, which determines whether the upgrade can successfully be completed in the allotted time required for the upgrade.

Of course, many other selections may be used such as, but not limited to: pairing virtual vehicle data with driver's phone data; looking at calendar events; looking at historic data to find times when the individual vehicle has never been used; looking at location of driver's phone relative to the vehicle and activating when the driver is sufficiently far away (temporally); and classifying the location type where a car is parked, and looking at the average time that the driver and all drivers spend at that classification of location, e.g. mall (long) vs. bank (short). The present invention is not intended to be limited by these selection methods.

A non-limiting example of a simple algorithm that could be used follows, which relies on location histories. A time-estimate for how long a vehicle is parked at a particular location (once stopped) might be determined as follows.

Estimated time at location=( (average time per weekday spent at this particular location, for this driver)*(scale factor 1)

+

(average time per weekday spent at locations with similar classifications, for this driver)*(scale factor 2)

+

(average time per weekend-day spent at this particular location, for this driver)*(scale factor 3)

+

(average time per weekend-day spent at locations with similar classifications, for this driver)*(scale factor 4)
+
(average time per weekday spent at this particular location, for all drivers)*(scale factor 5)
+
(average time per weekday spent at locations with similar classifications, for all drivers)*(scale factor 6)
+
(average time per weekend-day spent at this particular location, for all drivers)*(scale factor 7)
+
(average time per weekend-day spent at locations with similar classifications, for all drivers)*(scale factor 8)
)*normalizing factor The scale factors may be based on the environmental conditions, day, date, and/or other factors. The following provides examples of scale factors.
Scale factor 1=0.3 if a weekday, 0.1 if a weekend . . . (because this is per-driver, and based on a weekday history)
Scale factor 1=0.15 if a weekday, 0.05 if a weekend . . . (because this is per-driver, and based on a weekday history, and a similar type of location but not identical)
Scale factor 5=0.05 if a weekday, 0.01 if a weekend . . . (because this is for the aggregate fleet)

It should be noted that the normalizing factor is designed to correct for a possibly-dynamic number of inputs into the model. In addition, the algorithm for stop duration while the vehicle is still in motion is based off of prior trip history, trip matches, etc. In addition, the next stop location may be determined by a probabilistic approach—for a given trip, how much does the current trip match up with a historic trip. Again, weighting factors may be used, so:
Trip overlap=(
(Number of previous miles identical to another trip by this driver)*(scale factor 1)
+
(Similar day to previous trip)*(scale factor 2)
+
(Similar occupants to previous trip)*(scale factor 3)
+
(Similar weather to previous trip)*(scale factor 4)
+
(Similar season to previous trip)*(scale factor 5)
)*Normalizing factor Multiple prior trips may be compared simultaneously and the highest score trip for overlap is the most likely current trajectory, thus the next stop on the historic trip is the most likely next stop on the current trip. The first model may then be considered to estimate the duration of that stop.

Returning to FIG. 4, the service application 128 then transmits a push notification to the user portable interactive communication device 70 (block 208). In accordance with the present invention, the push notification provides one or more time available for upgrading the vehicle control module with the vehicle control module update application 38. For example, the push notification may list Saturday, Apr. 12, 2014, at 2 AM as a first option; Sunday, Apr. 13, 2014 at 1 AM as a second option; and Saturday, May 3, 2014, at 2 AM as a third option. One having ordinary skill in the art will appreciate that more or fewer available software upgrade time options may be transmitted (pushed) to the user portable interactive communication device 70.

As shown by block 210, the user of the portable interactive communication device 70 then selects one of the software upgrade time options on the portable interactive communication device 70, which is transmitted to the service application 128. In accordance with an alternative embodiment of the invention, more than one time option may be selected. In such a situation, the first available time slot would be used, however, if the first selected time slot becomes invalid prior to starting the update process, then the next available selected timeslot will be used.

At a predefined time period prior to the user selected software upgrade time, the service application 128 transmits a request for confirmation to the portable interactive communication device 70 (block 212). The predefined time period may be any time that provides ample notice to the user of the vehicle, as well as being close enough to the selected software upgrade time, so as to ensure that the user can not only confirm agreement with the selected software upgrade time, but also will not forget about the approaching selected software upgrade time. The request for confirmation may be provided in one of many different ways such as, but not limited to, electronic mail, an interactive graphical user interface, or a software application located on the portable interactive communication device 70 that displays the selected software upgrade time to the user requiring a confirmation or rejection of the upcoming selected software upgrade time.

As shown by block 214, the service application 128 then determines whether the user confirmed the selected software upgrade time. In accordance with the present invention, the service application 128 provides a specific amount of time for the user to respond with confirmation or rejection of the selected software upgrade time. If either the user rejects the selected software upgrade time or a response to the selected software upgrade time confirmation is not received within the specific amount of time provided for the user to respond, the service application 128 again queries the virtual vehicle application 126 for vehicle data and calculates a list of possible times to upgrade the vehicle control module with the vehicle control module update application 38 (block 206).

Alternatively, if the user confirms the selected software upgrade time, at the selected upgrade time, the service application 128 instructs the vehicle control module update application 38 to upgrade the vehicle control module with the vehicle control software stored within the vehicle storage device 40.

While the specific amount of time for the user to respond with confirmation or rejection of the selected software upgrade time may be predefined by the service application 128, in accordance with an alternative embodiment of the invention, the service application 128 may provide the user with an option to specify the specific amount of time. By doing so, the service application 128 provides a customization feature for the user since the user is most familiar with how much lead time is necessary to prevent the user from forgetting about the selected software upgrade time.

It should be noted that while the present description refers to over the air software updates, the present invention may instead be applied to tethered software upgrades such as for local area network enabled personal computers.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A non-transitory system for providing predictive software upgrades, comprising:
a memory; and
a processor configured by the memory to perform the steps of:
querying a virtual vehicle application that simulates a real vehicle, where the application is located at the system, to determine one or more time period when the vehicle will be in an off state for long enough for updating of software to take place without the vehicle operating status being changed;
transmitting a push notification to a user portable interactive communication device providing the one or more time periods determined, to the user for selection of one or more time period;
receiving a selected one or more time period for upgrading of the software;
transmitting a request for confirmation of a first of the one or more time period to the user portable interactive communication device at a predefined time period prior to the first of the one or more time period; and
if the user confirms the first time period, instructing the upgrading of the vehicle control module by the vehicle at the first time period.

2. The system of claim 1, wherein the step of querying the virtual vehicle application further comprises the step of calculating the one or more time period by use of historic vehicle data provided by the virtual vehicle application, wherein the historic vehicle data is determined at least in part from data received from a vehicle.

3. The system of claim 2, wherein the historic vehicle data received from the vehicle is at least partially received from a telemetry device located at the vehicle.

4. The system of claim 2, wherein the vehicle is the real vehicle being simulated.

5. The system of claim 1, wherein the processor is further configured by the memory to determine whether a software update is required for the vehicle control module of the vehicle.

6. The system of claim 5, wherein the processor is further configured by the memory to transmit a software update for the vehicle control module to the vehicle if a determination is made that the software update is required.

7. The system of claim 1, wherein upgrading of the vehicle control module further comprises instructing a vehicle control module update application stored within the vehicle to upgrade the vehicle control module with vehicle control software previously stored within the vehicle.

8. The system of claim 1, wherein if the request for confirmation is not received within a predefined time period, the processor is further configured by the memory to repeat the steps of querying the virtual vehicle application, transmitting a new push notification to the user portable interactive communication device providing a new one or more time period determined, to the user for selection of one or more time period, receiving a selected one or more time period for upgrading of the software, and transmitting a request for confirmation of a first of the new one or more time period to the user portable interactive communication device at a predefined time period prior to the new first of the one or more time period.

9. A non-transitory system for providing predictive software upgrades, comprising:
a memory; and
a processor configured by the memory to perform the steps of:
determining one or more time period when a device having software to be upgraded will be in an off state for long enough for updating of software to take place without the device changing state from off to on;
transmitting a push notification to a user portable interactive communication device providing the one or more time periods determined, to the user for selection of one or more time period;
receiving a selected one or more time period for upgrading of the software;
transmitting a request for confirmation of a first of the one or more time period to the user portable interactive communication device at a predefined time period prior to the first of the one or more time period; and
if the user confirms the first time period, instructing the upgrading of the software at the first time period.

10. The system of claim 9, wherein the processor is further configured by the memory to determine whether a software update is required.

11. The system of claim 9, wherein if the request for confirmation is not received within a predefined time period, the processor is further configured by the memory to repeat the steps of determining, transmitting a new push notification to the user portable interactive communication device providing a new one or more time period determined, to the user for selection of one or more time period, receiving a selected one or more time period for upgrading of the software, and transmitting a request for confirmation of a first of the new one or more time period to the user portable interactive communication device at a predefined time period prior to the new first of the one or more time period.

12. Method for providing predictive software upgrades, comprising the steps of:
querying a virtual vehicle application that simulates a real vehicle to determine one or more time period when the vehicle will be in an off state for long enough for updating of software to take place without the vehicle operating status being changed;
transmitting a push notification to a user portable interactive communication device providing the one or more time periods determined, to the user for selection of one or more time period;
receiving a selected one or more time period for upgrading of the software;
transmitting a request for confirmation of a first of the one or more time period to the user portable interactive communication device at a predefined time period prior to the first of the one or more time period; and
if the user confirms the first time period, instructing the upgrading of the vehicle control module by the vehicle at the first time period.

13. The method of claim 12, wherein the step of querying the virtual vehicle application further comprises the step of calculating the one or more time period by use of historic vehicle data provided by the virtual vehicle application, wherein the historic vehicle data is determined at least in part from data received from a vehicle.

14. The method of claim 13, wherein the historic vehicle data received from the vehicle is at least partially received from a telemetry device located at the vehicle.

15. The method of claim 13, wherein the vehicle is the real vehicle being simulated.

16. The method of claim 12, further comprising the step of determining whether a software update is required for the vehicle control module of the vehicle.

17. The method of claim 16, further comprising the step of transmitting a software update for the vehicle control module to the vehicle if a determination is made that the software update is required.

18. The method of claim 12, wherein upgrading of the vehicle control module further comprises instructing a vehicle control module update application stored within the vehicle to upgrade the vehicle control module with vehicle control software previously stored within the vehicle.

19. The method of claim 12, wherein if the request for confirmation is not received within a predefined time period, the processor is further configured by the memory to repeat the steps of querying the virtual vehicle application, transmitting a new push notification to the user portable interactive communication device providing a new one or more time period determined, to the user for selection of one or more time period, receiving a selected one or more time period for upgrading of the software, and transmitting a request for confirmation of a first of the new one or more time period to the user portable interactive communication device at a predefined time period prior to the new first of the one or more time period.

* * * * *